(12) United States Patent
Blumling

(10) Patent No.: US 7,701,383 B2
(45) Date of Patent: Apr. 20, 2010

(54) METHOD FOR DETECTING A TARGET

(75) Inventor: James P. Blumling, Dix Hills, NY (US)

(73) Assignee: Telephonics, Inc., Farmingdale, NY (US)

( * ) Notice: Subject to any disclaimer, the term of this patent is extended or adjusted under 35 U.S.C. 154(b) by 0 days.

(21) Appl. No.: 11/397,303

(22) Filed: Apr. 4, 2006

(65) Prior Publication Data

US 2007/0052577 A1 Mar. 8, 2007

(51) Int. Cl.
*G01S 7/285* (2006.01)
*G01S 13/00* (2006.01)
*G01S 13/90* (2006.01)

(52) U.S. Cl. .......... 342/89; 342/25 R; 342/91; 342/93; 342/175; 342/195

(58) Field of Classification Search ...... 342/25 R–25 F, 342/175, 195, 21, 22, 196, 197, 89–103, 342/159–164
See application file for complete search history.

(56) References Cited

U.S. PATENT DOCUMENTS

| | | | | |
|---|---|---|---|---|
| 5,532,699 | A | * | 7/1996 | Smith .......... 342/195 |
| 5,552,792 | A | * | 9/1996 | Smith .......... 342/195 |
| 6,538,599 | B1 | * | 3/2003 | David .......... 342/196 |

OTHER PUBLICATIONS

M.I. Skolnik, "Introduction to Radar Systems"; McGraw-Hill Book Company; New York; 1980; ISBN 0-07-057909-1; Section 2.6 (Integration of Radar Pulses); pp. 29-33.*

* cited by examiner

*Primary Examiner*—Bernarr E Gregory
(74) *Attorney, Agent, or Firm*—Thomas A. O'Rourke; Bonner & O'Rourke, LLP

(57) ABSTRACT

An improved radar system and method for detecting targets is described. The invention discriminately detects and analyzes a target by sub-dividing it into sections, and then, in combination with a sliding window integrator, assimilates accumulated high resolution channel and low resolution channel data to construct a complete image.

13 Claims, 1 Drawing Sheet

METHOD FOR DETECTING A TARGET

FIELD OF THE INVENTION

The present invention is directed to radar processing with high resolution radars.

BACKGROUND OF THE INVENTION

There are different types of high resolution radar. One type is pulse compression which is a radar method that typically combines the high energy of a long pulse width with the high resolution of a short pulse width. The pulse is frequency modulated which provides a method to further resolve targets which may have overlapping returns. Since each part of the pulse has a unique frequency, the two returns can be completely separated. The receiver is able to separate two or more targets with overlapping returns on the basis of the frequency.

Another type of high resolution radar is Synthetic Aperture Radar (SAR). Synthetic Aperture Radar uses the motion of the transmitter/receiver to generate a large effective aperture. In order to accomplish this, the system must store several returns taken while the antenna is moving and then reconstruct them as if they came in simultaneously. The most frequent application SAR is with satellite radar systems. Because the satellite is traveling at a high velocity, the accuracy of these systems can be made very high. Furthermore, in the event the target is fixed in location, the period for data collection can be made very long without introducing significant error. Therefore, satellite SAR is used for imaging fixed objects such as military bases.

Inverse Synthetic Aperture Radar (ISAR) is a third type of high resolution radar. In this method, a large synthetic aperture is created without moving the transmitter/receiver. If the target rotates by a small amount, it has the same effect as if the transmitter/receiver were to travel a distance equal to the arc length at the range "R". ISAR systems are typically used for long-range imaging and identification of possible targets. The ISAR platform may be fixed or moving. The best targets for ISAR are usually ships which tend to yaw periodically in the sea.

Sliding window base algorithms have been reported in connection with self training algorithms for Ultra-wideband SAR target detection. See Self Training Algorithms for Ultra-wideband Radar Target Detection, Aerosence, 2003. A set of localized regions within a giver SAR image are sampled in real-time for purposes of obtaining low-order and robust real-time cluster models. The real time models are applied in a sliding window type target detection paradigm for clutter cancellation and target detection. In this article, using Terrain Filtered SVD. In this approach, a convolutional spatial filter kernel is designed that computes an intensity-weighted distance metric from the kernel center in an effort to pre-filter severe "blob-like" and "sparsely-impulsive" clutter discretes. The particular filter kernel designed for this investigation is illustrated in FIG. 2. This is a convolutional pre-filter that is implemented as a sliding window over a test image. This kernel function is calculated by setting all pixels within an 11-pixel radius of the kernel center equal to zero and by equating the remainder of the pixels equal to the Euclidian distance between the kernel center and the pixel. The filter is implemented as a pixel-by-pixel sliding window where all the output values are stored in histogram form.

Generally, a sliding window algorithm works as follows. First, the sender assigns a sequence number, denoted SeqNum, to each frame. The sender maintains three variables: the send window size, denoted SWS, gives the upper bound on the number of outstanding (unacknowledged) frames that the sender can transmit; LAR denotes the sequence number of the last acknowledgment received; and LFS denotes the sequence number of the last frame sent. The sender also maintains the following invariant:

$$LFS-LAR+1 \leqq SWS$$

When an acknowledgment arrives, the sender moves LAR to the right thereby allowing the sender to transmit another frame. Also, the sender associates a timer with each frame it transmits, and retransmits the frame should the timer expire before an ACK is received. Notice that the sender has to be willing to buffer up to SWS frames since it must be prepared to retransmit them until they are acknowledged.

The receiver maintains the following three variables: the receive window size, denoted RWS, gives the upper bound on the number of out-of-order frames that the receiver is willing to accept; LFA denotes the sequence number of the last frame acceptable; and NFE denotes the sequence number of the next frame expected. The receiver also maintains the following invariant:

$$LFA-NFE+1 \leqq RWS$$

When a frame with sequence number SeqNum arrives, the receiver takes the following action. If SeqNum<NFE or SeqNum>LFA, then the frame is outside the receiver's window, and it is discarded. If NFE≦SeqNum≦LFA, then the frame is within the receiver's window and it is accepted. Now the receiver needs to decide whether or not to send an ACK. SeqNumToAck denote the largest sequence number not yet acknowledged, such that all frames with sequence numbers less than SeqNumToAck have been received. The receiver acknowledges the receipt of SeqNumToAck, even if higher numbered packets have been received. This acknowledgment is said to be cumulative. It then sets NFE=SeqNumToAck+1, and adjusts LFA=SeqNumToAck+RWS.

Sliding window algorithms are a method of flow control for network data transfers. TCP, the Internet's stream transfer protocol, uses a sliding window algorithm. A long-term stream of data from A to B is sent as a sequence of IP packets. Each packet contains a sequence number. An ACK (acknowledgment) packet is sent back to A by B for each packet P correctly received. The ACK packet contains the sequence number of P. It is inefficient for the sender to wait after each packet for its ACK before sending the next, so A and B agree on a window: a maximum number of packets, say 10, which can be sent before being acknowledged. The sender keeps track of the last packet to be acknowledged; the receiver reserves 10 buffers.

A sliding window algorithm places a buffer between the application program and the network data flow. For TCP, the buffer is typically in the operating system kernel. Data received from the network is stored in the buffer, from whence the application can read at its own pace. As the application reads data, buffer space is freed up to accept more input from the network. The window is the amount of data that can be "read ahead"—the size of the buffer, less the amount of valid data stored in it. Window announcements are used to inform the remote host of the current window size. If the local application can't process data fast enough, the window size will drop to zero and the remote host will stop sending data. After the local application has processed some of the queued data, the window size rises, and the remote host starts transmitting again. On the other hand, if the local application can process data at the rate it's being transferred, sliding window still gives an advantage. If the window size is larger than the packet size, then multiple packets can be outstanding in the network, since the sender knows that buffer space is available on the receiver to hold all of them. Ideally, a steady-state condition can be reached where a series of packets (in the forward direction) and window announcements (in the reverse direction) are constantly in transit. As each new window announcement is received by the sender, more data packets are transmitted. As the application reads data from the buffer (remember, we're assuming the application can keep up with the network), more window announcements are generated. Keeping a series of data packets in transit ensures the efficient use of network resources.

SUMMARY OF THE INVENTION

The present invention improves detection performance against larger targets that are frequently over resolved by a high resolution radar. Many radars normally detect targets by processing each range resolution cell individually, even when they divide a target into multiple range cells. Once a large target is detected, prior art radars may reconstruct the target so as to not display multiple targets on the display. The present invention employs a Sliding Window Range Indicator to noncoherently integrate multiple contiguous range cells to reconstruct larger target cross-sections prior to detection. This process improves detection.

DETAILED DESCRIPTION OF THE INVENTION

Figure 1:
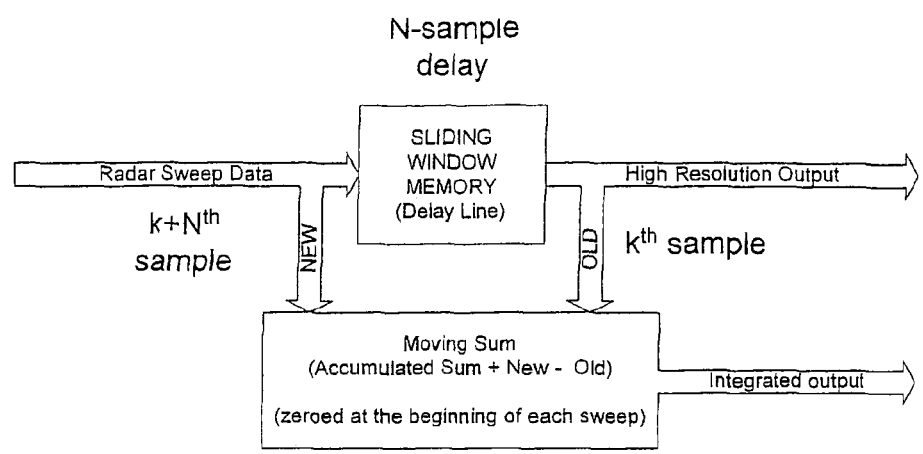
FIG. 1 is a representation of the Sliding Window Integrator of the present invention.

FIG. 1 describes the present invention. The range data from a single radar sweep (single pulse) is accumulated in such a way so as to form a continuous sum of the magnitude of the last N range cells. The accumulation is zeroed at the beginning of each sweep and then is updated as each sample is clocked through the system by adding the K & $N^{th}$ sample and subtracting the older $K^{th}$ sample. The sweep data is also initialized with at least N zeros at the beginning of each sweep. The process outputs both a high resolution channel and a low resolution, sliding window integrated channel.

A high resolution radar will divide a target into many smaller pieces, each with a smaller radar cross section (RCS) than the original. By providing one or more additional channels that integrate many range cells for each output, this effect can be minimized. A Sliding Window Range Integrator can be formed that is tuned to a given target length, so that it noncoherently integrates multiple range cells to match the typical length of a preferred target. This will also minimize the loss associated with other targets which may be larger or even somewhat smaller than the preferred target.

Sliding Window Range Integrator Performance

The following program (Math Cad) provides some examples of the benefit of this approach using a "noise-only" case.

$$\lambda := \frac{c}{9.475 \text{ GHz}}$$

Input Target Dimensions
Tgt: = 1 . . . 7

| Tgt = | Length$_{Tgt}$: = | Width$_{Tgt}$: = |
|---|---|---|
| 1 | 0.5 · ft | 0.5 · ft |
| 2 | 15 · ft | 5 · ft |
| 3 | 40 · ft | 12 · ft |
| 4 | 85 · ft | 16 · ft |
| 5 | 130 · ft | 32 · ft |
| 6 | 225 · ft | 48 · ft |
| 7 | 500 · ft | 80 · ft |

Average Length Used to Determine Performance $$AveTgtLgth_{Tgt} := \frac{\int_{-\pi}^{\pi} \left( \begin{array}{c} |\cos(\theta) \cdot Length_{Tgt}| + \\ |\sin(\theta) \cdot Width_{Tgt}| \end{array} \right) d\theta}{2 \cdot \pi}$$

$$Res := 5 \cdot ft$$

$$NPieces(Res, Tgt) := if\left(1 > \frac{AveTgtLgth_{Tgt}}{Res}, 1, \frac{AveTgtLgth_{Tgt}}{Res}\right)$$

Read Meyer & Mayer Signal-to-Noise Data:

Signal_to_Noise_file="SNC262_3.dat"

SNMAT:=READPRN(Signal_to_Noise_File)     $P_d$:=SNMAT$_{1,0}$

NR:=rows (SNMAT)−1 CASE:=SNMAT$_{0,0}$ $P_d$=0.62

NR=17 CASE:=2 ii:=2 . . . NR

NPULSVEC$_{ii-2}$:=SNMAT$_{ii,0}$ SIGNOIVEC$_{ii-2}$:=SNMAT$_{ii,1}$

VSS:=lspline(NPULSVEC,SIGNOIVEC)

S_N_NonCoh (NPULS):=interp(VSS,NPULSVEC,SIGNOIVEC,NPULS)

First Assume Noncoherent Integration of SW2 Target (though this is not over time, but over range):

ResLossNC(Res,Tgt):=−(10·log(NPieces(Res,Tgt)))+ (S_N_NonCoh(1)−S_N_NonCoh(NPieces(Res,Tgt)))

Loss with Tuned "Sliding Window Range Integrator" for Each Target

| Tgt = | AveTgtLgth$_{Tgtft}$ = | ResLossNC(7.5 · ft, Tgt) = | ResLossNC(5 · ft, Tgt) = | |
|---|---|---|---|---|
| 1 | 0.64 | 0 | 0 | (Tuning to range |
| 2 | 12.73 | 0.41 | 0.34 | cell With "sliding |
| 3 | 33.1 | 0.09 | −0.33 | window" reduces |
| 4 | 64.3 | −0.64 | −1.18 | loss)* |
| 5 | 103.13 | −1.27 | −1.92 | |

-continued

Loss with Tuned "Sliding Window Range Integrator" for Each Target

| Tgt = | AveTgtLgth$_{Tgtft}$ = | ResLossNC(7.5 · ft, Tgt) = | ResLossNC(5 · ft, Tgt) = |
|---|---|---|---|
| 6 | 173.8 | −2.08 | −2.72 |
| 7 | 369.24 | −3.39 | −4.11 |

*Losses without this approach shown on next page

Consider Peak Detection (the most likely situation due to range collapsing):

$Pd_{out} := 0.62$

Note: Ignore small effect on false alarm rate. Look only at Pd effects.

$Pd_{in}(Res, Tgt) := 1 - (1 - Pd_{out})^{\frac{1}{NPieces(Res,Tgt)}}$

NPnt := 0 ... 15   (pfa = 1 × 10$^{-3}$)
ProbVec2$_{NPnt}$ :=    SNVec2$_{NPnt}$ :=

| ProbVec2 | SNVec2 |
|---|---|
| 95 | 21.2 |
| 90 | 18.1 |
| 80 | 14.7 |
| 70 | 12.6 |
| 60 | 10.95 |
| 50 | 9.5 |
| 40 | 8.15 |
| 30 | 6.75 |
| 20 | 5.15 |
| 10 | 3.03 |
| 5 | 1.13 |
| 4 | 0.55 |
| 3 | −0.1 |
| 1 | −3 |
| 0.5 | −5.15 |
| 0.2 | −9.5 |

LogProbVec$_{NPnt}$ := log(ProbVec2$_{15-NPnt}$)

SNVec$_{NPnt}$ := SNVec2$_{15-NPnt}$

VSSs := lspline(LogProbVec,SNVec)
S_N_NCIntg(LogProb) := interp(VSSs, LogProbVec, SNVec, LogProb)
GainPeak(Res, Tgt) := S_N_NCIntg(log(Pd$_{out}$ · 100)) − S_N_NCIntg(log(Pd$_{in}$(Res, Tgt) · 100))

| Tgt = | Pd$_{in}$(Res, Tgt) = | GainPeak(7.5 · ft, Tgt) = | GainPeak(50 · ft, Tgt) = |
|---|---|---|---|
| 1 | 0.62 | 0 | 0 |
| 2 | 0.32 | 2.64 | 0 |
| 3 | 0.14 | 6.16 | 0 |
| 4 | 0.07 | 8.04 | 1.35 |
| 5 | 0.05 | 9.29 | 3.45 |
| 6 | 0.03 | 10.65 | 5.38 |
| 7 | 0.01 | 12.42 | 7.64 |

ResLossPeak(Res, Tgt) := −(10 · log(NPieces(Res, Tgt))) + GainPeak(Res, Tgt)

Determine Average Power Per Mode
NPRF := 1 ... 13
PeakPwr := 8000 · W

| PRF$_{NPRF}$ := | PW$_{NPRF}$ := | PWC$_{NPRF}$ := |
|---|---|---|
| 2491 | 10 · μsec | 100 · nsec |
| 1513 | 10 · μsec | 100 · nsec |
| 750 | 40 · μsec | 100 · nsec |
| 391 | 40 · μsec | 100 · nsec |
| 800 | 24.3 · μsec | 6.7 · nsec |
| 1024 | 24.3 · μsec | 6.7 · nsec |
| 1990 | 17.5 · μsec | 100 · nsec |
| 600 | 65 · μsec | 10 · nsec |
| 1200 | 30 · μsec | 15 · nsec |
| 560 | 42 · μsec | 100 · nsec |
| 1120 | 42 · μsec | 100 · nsec |
| 520 | 42 · μsec | 100 · nsec |
| 1040 | 42 · μsec | 100 · nsec |

SW_Improv(Res, Tgt) := ResLossNC(Res, Tgt) − ResLossPeak(Res, Tgt)

Improvement Using "Sliding Window" vs High Resolution Channel Alone for 10$^{-3}$ pfa and 0.62 Pd in Noise*

| Tgt = | SW_Improv(7.5 · ft, Tgt) = | SW_Improv(5 · ft, Tgt) = |
|---|---|---|
| 1 | 0 dB | 0 dB |
| 2 | 0.06 | 0.13 |
| 3 | 0.38 | 0.54 |
| 4 | 0.65 | 0.8 |
| 5 | 0.82 | 0.87 |
| 6 | 0.92 | 1.13 |
| 7 | 1.11 | 1.05 |

*Note that improvement would be better with lower Pfa's and higher Pd's, which would be associated with less scan integration.

I claim:

1. A method for detecting a target comprising:
  Receiving multiple radar signals of different resolution through a plurality of channels; said plurality of channels comprise at least a first channel and a second chan-

Losses in High Resolution Channel vs Resolution Cell, Due to Tgt Breakup

| Tgt = | ResLossPeak(7.5 · ft, Tgt) = | ResLossPeak(5 · ft, Tgt) = | ResLossPeak(50 · ft, Tgt) = | ResLossPeak(7.5 · ft, Tgt) − ResLossPeak(5 · ft, Tgt) = | ResLossPeak(50 · ft, Tgt) − ResLossPeak(7.5 · ft, Tgt) = |
|---|---|---|---|---|---|
| 1 | 0 | 0 | 0 | 0 | 0 |
| 2 | 0.34 | 0.21 | 0 | 0.14 | −0.34 |
| 3 | −0.29 | −0.87 | 0 | 0.58 | 0.29 |
| 4 | −1.29 | −1.98 | 0.25 | 0.69 | 1.55 |
| 5 | −2.09 | −2.79 | 0.31 | 0.7 | 2.4 |
| 6 | −3 | −3.85 | −0.03 | 0.85 | 2.97 |
| 7 | −4.5 | −5.17 | −1.04 | 0.66 | 3.46 | nel, said first channel receives the highest resolution signal of any channel of said plurality of channels;

Accumulating radar sweep data from said series of lower resolution transmitted signals;

Forming a continuous sum of N range cells by adding the magnitudes of N range cells;

Updating the continuous sum as each sweep is performed by adding the magnitude of the newest range cell to the sum of the previous N range cells and subtracting the magnitude of the oldest range cell;

Zeroing the continuous sum at the beginning of each sweep;

Integrating accumulation data from each channel.

2. The method according to claim 1 wherein the channel receiving a higher resolution signal divides a target into individualized smaller pieces, each with a smaller radar cross-section than the original target.

3. The method according to claim 2 wherein the channel receiving a lower resolution signal non-coherently integrates multiple range cells.

4. The method according to claim 3 wherein the number of range cells are proportional to a given target length.

5. A method for detecting a target comprising:

Receiving multiple radar signals of different resolution through a plurality of channels; said plurality of channels comprise at least a first channel and a second channel, said first channel processing a higher resolution signal than said second channel; said second channel processing a higher resolution signal than any channel of said plurality of channels, excluding said first channel;

Accumulating radar sweep data in said series of lower resolution channels using a sliding window range integrator;

Integrating the output from each channel.

6. The method according to claim 5 wherein the size of number of range cells used to calculate the output of the sliding window integrator channel is proportional to a given target length.

7. The method according to claim 6 wherein said channel processing said series of radar signals at a higher resolution divides a target into individualized smaller pieces, each with a smaller radar cross-section than the original target.

8. A method for detecting a target comprising:

receiving said signal through a plurality of channels; said plurality of channels comprise at least a first and a second channel, said second channel processing said series of radar signals at a higher resolution than said first channel; said second channel processing said series of radar signals at a lower resolution than any channel of said plurality excluding said first channel;

accumulating radar sweep data from said lower resolution channels;

forming a continuous sum of range cells from said accumulated radar sweep data by adding the magnitudes of said range cells;

updating said continuous sum as each sweep is performed by adding the magnitude of the newest range cell to the continuous sum and subtracting the magnitude of the oldest range cell from the continuous sum;

zeroing the continuous sum at the beginning of each sweep.

integrating the output from each channel.

9. The method according to claim 8 wherein said channel processing said series of radar signals at a higher resolution divides a target into individualized smaller pieces, each with a smaller radar cross-section than the original target.

10. The method according to claim 9 wherein said channel processing said series of radar signals at a lower resolution non-coherently integrates multiple range cells.

11. The method according to claim 10 wherein the number of range cells used to calculate the continuous sum are proportional to a given target length.

12. A method for detecting a target comprising:

Transmitting a radar signal, said signal dividing said target into a plurality of returns, said returns having a smaller radar cross section than said target;

Receiving said signal through a first and second channel, said first channel being a radar signal output channel, said second channel being a sliding window range integrator channel;

Accumulating radar sweep data from said series of lower resolution transmitted signals in said sliding window range integrator channel;

Forming a continuous sum of range cells by adding the magnitudes of said range cells;

Updating the said continuous sum as each sweep is performed by adding the magnitude of the newest range cell to the said continuous sum of the previous N range cells and subtracting the magnitude of the oldest range cell from said continuous sum;

Zeroing the continuous sum at the beginning of each sweep;

Integrating the output of each channel.

13. The method according to claim 12 wherein the number of range cells used to calculate the continuous sum are proportional to a given target length.

* * * * *